Patented Oct. 11, 1932

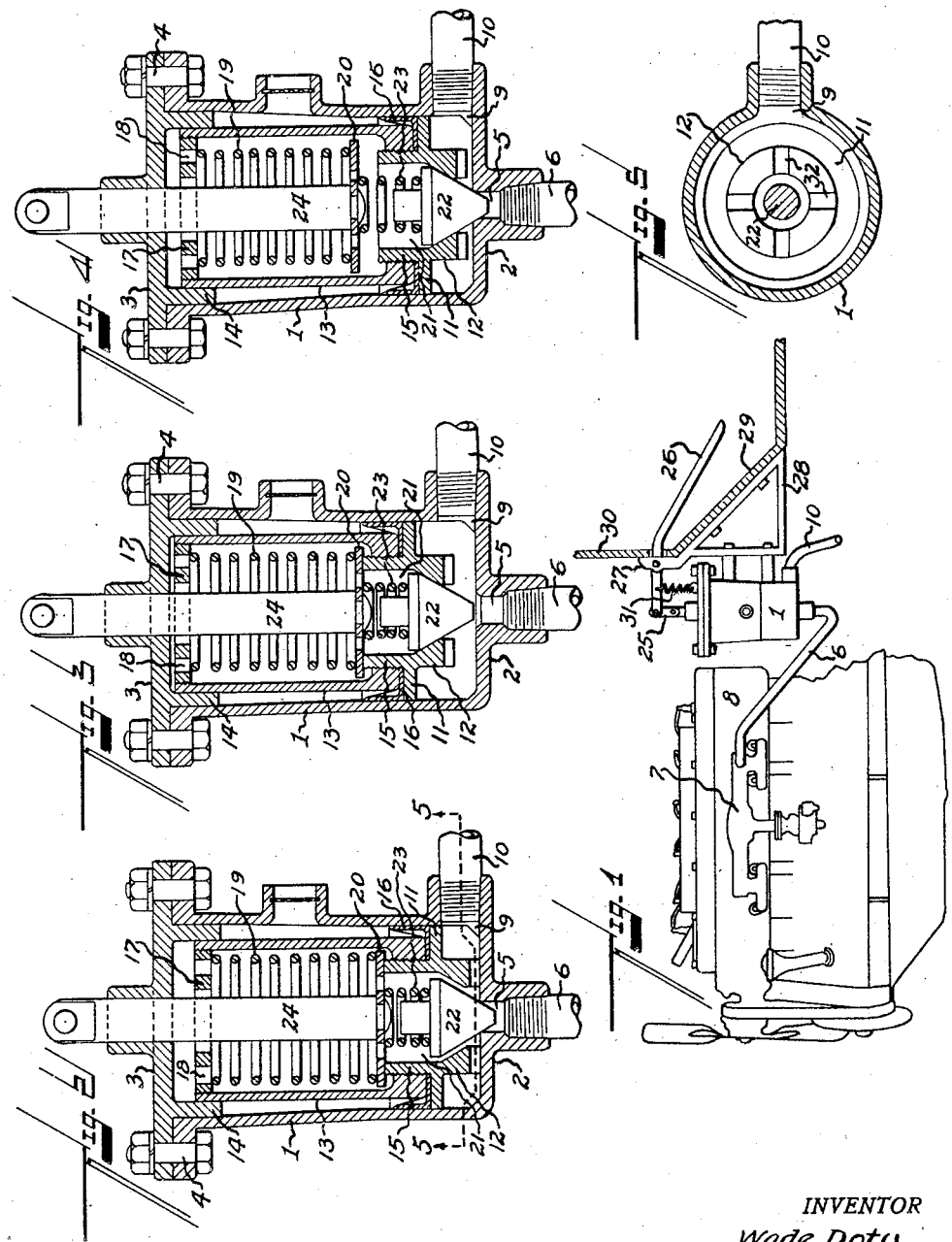

1,882,411

UNITED STATES PATENT OFFICE

WADE DOTY, OF JAMESTOWN, NEW YORK, ASSIGNOR TO INTERNATIONAL AIR BRAKE COMPANY, OF SALT LAKE CITY, UTAH, A CORPORATION OF UTAH

VACUUM CONTROLLING BRAKE VALVE

Application filed January 13, 1930. Serial No. 420,565.

This invention relates to control valves for fluid braking systems, and particularly for braking systems depending upon subatmospheric pressure or a vacuum effect for motive power.

An object of the invention is to adapt a single valve member to control communication between a brake line and the atmosphere, and between said line and evacuating means, such as an engine intake manifold.

Another object is to provide for automatic seating of said valve member, responsive to a predetermined evacuation of the brake line whereby any superfluous application of power is avoided.

Still another object is to provide a fluid braking valve comprising a ported piston and a valve member seating on said piston to control its port, and a casing wherein said piston reciprocates, having openings at one side of said piston connected to a brake line and an evacuation line, and an opening to the atmosphere at the other side of said piston, said valve member controlling communication between the brake line and atmosphere by way of the piston port, and also controlling communication between the evacuation and brake lines.

A further object is to provide a valve of the described character in which the subatmospheric brake-energizing effect reacts through a suitable piston upon the brake control pedal, thereby indicating roughly the magnitude of the applied power.
These and various other objects the invention attains by the construction hereinafter described and illustrated in the accompanying drawing, wherein:

Fig. 1 is a diagrammatic, elevational view in partial section, showing the installation of the herein disclosed valve upon a motor vehicle.

Fig. 2 is a view in axial, sectional elevation of said valve, showing its normal or nonbraking position.

Fig. 3 is a similar view, showing the positions of the valve parts established by an applied braking force less than a predetermined maximum.
Fig. 4 is a similar view of the valve, automatically limiting the magnitude of the applied power.

Fig. 5 is a fragmentary cross sectional view, taken upon the line 5—5 of Fig. 2 and primarily showing certain structural features of the piston.

In these views, the reference character 1 designates a cylindrical valve casing having an integral head 2 closing its lower extremity and a head 3 removably attached to its upper end by bolts 4 or the like. Centrally formed in the head 2 is an opening 5 connected through a suitable duct 6 to the intake manifold 7 of a vehicle engine 8 (see Fig. 1). It is here to be noted that the duct 6, while preferably connected as described, may be connected to the engine or its accessories in any manner that will effect evacuation of said duct by the engine.

Adjacent to the head 2, the casing is formed with a lateral opening 9, connected to a brake line duct 10 leading to one or more brake-applying motors (not shown). A piston 11, mounted for a limited reciprocation in the lower portion of the casing 1, is formed on its under face with a central boss 12, normally seating against the head 2.

Upward actuation of said piston is limited by a sleeve 13 rigidly attached to and coaxially upstanding from said piston, its upper end being guided in an annular flange 14 carried by the head 3 and snugly inserted in the casing. The over all length of said piston and sleeve is so proportioned to the interior length of the casing, as to afford the piston only a limited play. To mount the sleeve 13 on the piston, it is preferred to form the latter with an upstanding integral collar 15, upon which said sleeve is threaded. Between said sleeve and the piston is clamped an ordinary cup leather or other flexible sealing ring 16, having a portion upwardly projecting against the casing wall.

The upper end of the sleeve 13 has a disk 17 screw threaded therein, in which openings 18 are formed, permitting a circulation of air and providing further for engagement of said disk by an actuating tool. Within said sleeve a coiled spring 19 is compressed between the disk 17 and a lower disk 20 normally seating the latter upon the collar 15.

Centrally formed in the piston is a port 21 opening upwardly through the collar 15 and downwardly through the boss 12, and having a conical portion adapted to seat a frustro-conical valve member 22, formed preferably of rubber. Between the latter and the disk 20 is compressed a coiled spring 23, urging said valve member to close both the port 21 and the opening 5. The arrangement is such that when the piston is in its normal position shown in Fig. 2, said valve member seats marginally of the opening 5 to close the latter and is thereby held unseated with respect to the piston port 21.

A rod 24 riveted or otherwise rigidly secured to the disk 20 passes freely through the disk 17 and slidably through the head 3, and is connected above said head through a link 25 to a foot lever 26. The latter is pivoted at 27 to a bracket 28 attached to the front of the foot board 29 of the vehicle, said foot lever passing freely through the vehicle dash 30 and having a rear pedal portion normally spaced above the foot board, as best appears in Fig. 1.

A coiled spring 31 may be extended from the forward portion of the foot lever 26 downwardly to the casing 1 to maintain the foot pedal of said lever normally raised, as appears in Fig. 1, and established the normal lowered position of the piston shown in Fig. 2.

In use of the described valve, upon depression of the foot pedal the rod 24 and disk 20 are raised proportionately to the pedal travel, as appears in Fig. 3, and the piston 11 is correspondingly actuated, the spring 19 being sufficiently stiff to resist flexing under such conditions. As the piston rises, the valve member 22 is held by its spring 23 seated marginally of the opening 5 until the seat-forming portion of the port 21 engages said valve member, whereupon continued travel of the piston lifts said valve member to uncover the opening 5. Thus, communication between the brake line and the atmosphere is cut off preliminary to establishing communication between said line and the evacuation duct 6. Air may now be withdrawn from the brake line by way of the opening 5, the boss 12 being radially slotted as indicated at 32 to facilitate such flow. The extent of such evacuation of the brake line is determined by the pedal actuation, and the brakes are applied (through a motor or motors not shown) to a corresponding extent. When evacuation of the brake line is adequate to effect a desired maximum braking intensity, the spring 19 is overcome by downward atmospheric pressure on the piston, lowering the latter, whether or not pressure on the foot pedal is relieved. Thus, Fig. 4 shows the piston lowered and the spring 19 slightly compressed, the rod 24 and disk 20 remaining in their raised positions. This automatically establishes a maximum limit of braking intensity. Under such conditions, the piston will not ordinarily be completely lowered, as appears in Fig. 2, but will assume the position shown in Fig. 4, slightly removed from the head 2 in which position the valve member 22 seats marginally of the opening 5 without uncovering the port 21. The applied braking pressure may be partially relieved, if desired, by sufficiently reducing pressure on the foot pedal to allow a partial downward stroke of the piston, and when the applied pressure is below maximum, an increased lowering of the foot pedal and corresponding raising of the piston will further increase the applied pressure. Thus it is seen that the described valve is adapted to establish and maintain any degree of braking pressure up to the predetermined maximum.

It is an important feature of the described construction that atmospheric pressure acting upon the piston is opposed to the force applied to the foot pedal and is proportioned in its braking effect to the degree of evacuation of the brake line. Thus, the operator is enabled to sense, through the reaction of the foot pedal against his foot, the intensity of braking at all times.

While it is apparent that the illustrated embodiment of my invention herein disclosed is well calculated to adequately fulfill the objects and advantages primarily stated, it is to be understood that the invention is susceptible to modification, variation and change within the spirit and scope of the subjoined claims.

What I claim is:

1. A control valve for a fluid braking system, comprising a casing provided at one end with a detachable head having an annular flange fitting into said casing, and further comprising a ported piston reciprocatory in said casing, said casing having an opening to the atmosphere at one side of the piston and having openings at the other side of the piston for connection respectively with a brake line and an evacuation line, one of the last named openings being substantially aligned axially of the casing with said piston port, a valve member carried by the piston controlling the piston port and also the aligned casing port, an extension from said piston at its side adjacent to the opening of the casing to the atmosphere slidable within said annular flange and, formed remote from the piston with a spring abutment, an actuating member for the piston slidable in said detachable head of the casing and extending toward the piston beyond said abutment and formed adjacent to the piston with another spring abutment, and a spring compressed between said abutments.

2. A control valve for a fluid braking system, comprising a casing and a member reciprocatory in said casing in sealing engagement with the wall thereof dividing the casing into two compartments, one of said compartments having an opening to the atmosphere, and the other having two openings for connection respectively with a brake line and an evacuation line, said reciprocatory member being ported to connect said compartments, the sleeve carried by said reciprocatory member projecting within the compartment having an opening to the atmosphere, a spring abutment carried by said sleeve remote from the ported member, an actuating element slidable through said sleeve and projecting exteriorly of the casing, a companion spring abutment carried by said actuating element within said sleeve and formed with an air opening, a collar centrally carried by said reciprocatory member adapted to seat said apertured abutment, and forming a passage for connecting the two said compartments, a valve member mounted within said collar to control the opening therethrough and further controlling the aligned opening of the casing, and a spring compressed within said collar between the apertured spring abutment and said valve member, urging the latter toward its seats.

In testimony whereof I sign this specification.

WADE DOTY.